United States Patent
Nampally et al.

(10) Patent No.: US 9,729,653 B2
(45) Date of Patent: Aug. 8, 2017

(54) SYSTEMS AND/OR METHODS FOR AUTOMATICALLY TUNING A DELIVERY SYSTEM FOR TRANSMISSION OF LARGE, VOLATILE DATA

(71) Applicant: Software AG, Darmstadt (DE)

(72) Inventors: Aditya Babu Nampally, Hyderabad (IN); Vishal Byakod, Bangalore (IN)

(73) Assignee: SOFTWARE AG, Darmstadt (DE)

( * ) Notice: Subject to any disclaimer, the term of this patent is extended or adjusted under 35 U.S.C. 154(b) by 665 days.

(21) Appl. No.: 14/162,460

(22) Filed: Jan. 23, 2014

(65) Prior Publication Data
US 2015/0207851 A1  Jul. 23, 2015

(51) Int. Cl.
*G06F 15/16* (2006.01)
*H04L 29/08* (2006.01)

(52) U.S. Cl.
CPC ...... *H04L 67/2809* (2013.01); *H04L 67/1017* (2013.01)

(58) Field of Classification Search
CPC . H04L 29/08; H04L 67/2809; H04L 67/1017; H04L 67/06
USPC ........................................ 709/217, 224, 200
See application file for complete search history.

(56) References Cited

U.S. PATENT DOCUMENTS

| | | | |
|---|---|---|---|
| 6,601,116 B1* | 7/2003 | Shemla ................. | H04L 49/901 370/412 |
| 7,089,009 B1* | 8/2006 | Fauconnier ....... | H04W 36/0055 370/352 |
| 8,135,836 B2* | 3/2012 | Sharma ............... | H04L 67/1008 709/226 |
| 8,136,122 B2 | 3/2012 | Holar et al. | |
| 8,453,162 B2 | 5/2013 | Groetzner et al. | |
| 8,453,163 B2 | 5/2013 | Kothamasu et al. | |
| 9,001,663 B2* | 4/2015 | Attar ....................... | H04L 47/10 370/235.1 |
| 2002/0178273 A1* | 11/2002 | Pardo-Castellote .... | H04L 67/12 709/230 |
| 2004/0103220 A1* | 5/2004 | Bostick ................... | H04L 12/24 709/253 |
| 2007/0203976 A1* | 8/2007 | Bein .................... | G06F 11/2038 709/203 |
| 2008/0141321 A1* | 6/2008 | Kubat ................ | H04N 7/17318 725/110 |
| 2013/0086092 A1* | 4/2013 | James ............... | G06F 17/30551 707/758 |

(Continued)

*Primary Examiner* — El Hadji Sall
(74) *Attorney, Agent, or Firm* — Nixon & Vanderhye P.C.

(57) ABSTRACT

Certain example embodiments relate to the concept of controlling the flow of data by providing an intelligent flow controller/manager, and a client-side component for the selection of a communication channel from a pool, and having these components communicate to regulate data flow through gateways to a broker- and/or other-type secondary stage. Data fragmentation and reassembly can be used to increase performance, e.g., through self-regulating behaviors. Advantageously, reliability is improved by enabling in-memory data persistence, rather than resorting to potentially performance-degrading use of disk storage. The delivery mechanism may be used to deliver data to multiple consumers, providing an end-to-end sender-to-consumer solution that self-regulates to optimize the data flow while still being reliable.

26 Claims, 6 Drawing Sheets

(56) References Cited

U.S. PATENT DOCUMENTS

2014/0019677 A1* 1/2014 Chang .................. G06F 3/0619
   711/105
2014/0173092 A1* 6/2014 Uluderya ............ H04L 67/1008
   709/224

* cited by examiner

SYSTEMS AND/OR METHODS FOR AUTOMATICALLY TUNING A DELIVERY SYSTEM FOR TRANSMISSION OF LARGE, VOLATILE DATA

TECHNICAL FIELD

Certain example embodiments described herein relate to application integration techniques using brokers. More particularly, certain example embodiments described herein relate to techniques for data flow management and control of large, volatile data sets. In certain example embodiments, it becomes possible to automatically tune a delivery system involving multiple senders and multiple consumers where such data is being transmitted, e.g., using a broker cluster.

BACKGROUND AND SUMMARY OF EXAMPLE EMBODIMENTS OF THE INVENTION

Companies today are tasked with implementing solutions for many types of integration challenges within their respective enterprises. Many of these challenges involve issues of application integration (e.g., integration among and/or between software applications and/or other systems) and fall into common patterns.

For example, a first area relates to propagation of similar business objects from one system to multiple other systems, such as, for example, in an order status change or a product price change. A second area relates to synchronization of similar business objects between two or more systems to obtain a single view, such as, for example, a real-time synchronization of customer, product registration, product order, and product SKU information among several applications. This is one of the most common issues requiring an integration solution. In a one-way synchronization, there generally is one system (e.g., resource) that acts as a data source and one or more resources that are targets of the synchronization. In a two-way synchronization, every resource often is both a potential source and target of a synchronization. There generally is not a single resource that acts as the primary data resource. Thus, a change to any resource should be reflected in all other resources. A third area involves information joined from multiple sources into a common destination system, such as, for example, communicating pharmacy customer records and prescription transactions and website data into a central application and database.

Various tools have been provided that enable a user to design and deploy solutions that address these challenges using, for example, the publish-and-subscribe model or one of its variants. The publish-and-subscribe model is a specific type of message-based solution in which messages are exchanged anonymously through a message broker. Applications that produce information that needs to be shared make this information available in specific types of recognizable documents that they publish to the message broker. Applications that require information subscribe to the document types they need.

At runtime, the message broker receives documents from publishers and then distributes the documents to subscribers. The subscribing application processes or performs work using the document and may or may not send a response to the publishing application.

In a typical system, an integration server or applications running on an integration server publish documents to a broker. The broker then routes the documents to subscribers located on other integration servers. The integration server and the broker share a fast, efficient process for exchanging documents across the entire system.

Brokers can be linked to form units known as territories, and brokers that form a territory may sometimes function as a single logical broker. Clients that connect to one broker in a territory can automatically exchange documents with clients connected to any of the brokers in the territory. Territories can be organized in any desired way, e.g., to take into account factors such as, for example, geographical distribution of clients and/or back-end services, the types of services offered, actual and/or expected traffic, actual and/or expected processing loads, etc. Territories thus may help support scalability by allowing one to segment traffic among multiple brokers, while still treating the brokers as a single operational unit.

Alternatively, or in addition, brokers can be grouped into clusters. As used herein and is understood by those skilled in the art, territories and clusters are different concepts. Clusters may be thought of as including a set of loosely or tightly connected computers (depending on the implementation) that work together so that they can in many respects be viewed as a single system. Territories as described herein typically will have no master/slave relationship, whereas the same is not necessarily true when clusters are involved. In this vein, one further difference as between territories and clusters may relate to the way in which clusters oftentimes are set up and run (e.g., apart from the master/slave concept) and, more particularly, to the notion of typically using clusters to distribute workload and solve performance and/or reliability issues with a system, as these concepts generally are not associated with what a territory does. For instance, a territory may use a set of brokers to distribute the workload, and also frequently may involve a message, document, or the like, being published to all subscribers across all brokers at the same time, e.g., such that a publisher client only has to publish to a nearest (or any) broker, with the system ensuring that subscriber clients in the group (allowed to receive the publication) can access it from its nearest (or any) broker in the territory (or even through a territory gateway to another territory). By contrast, a cluster might in some cases help to distribute the workload amongst the brokers in a cluster, but involve a message, document, or the like, being published to only one broker in a cluster.

It will be appreciated that it would be desirable in many instances (including, for example, those where mission-critical applications are involved) to provide a messaging infrastructure technology that supports the capability to send data from a producer to a consumer in the fastest possible manner while still ensuring guaranteed delivery. The transmission of documents using technologies like the Java Message Service (JMS), for example, has become common in data exchange/brokerage scenarios. Significant performance boosts can be observed in the case of volatile (e.g., non-persisted) data. But volatile data, while at least in theory promising a boost to the overall performance of the data transmission, tends to carry with it a cost of non-reliability (e.g., as the failover case is not handled). As a result, in such instances, the tradeoff of reliability versus performance is weighted in the favor of performance in many technological implementations.

To help guarantee delivery (in the event of a system failure, for example), messaging systems oftentimes recommend administrators to mark the messages as "persistent." In many common messaging systems, a persistent message will be guaranteed to be delivered once-and-only-once. The general goals in such cases are that persistent messages will not be lost as a result of a messaging system failure or the like, and that they will not be delivered two or more times. When operating in a persistent mode, a persistent message generally will not be considered sent until it has been safely written to a file or database.

But resorting to a "persistence mode" can have adverse effects on message transmission performance. As will be appreciated, the costs of ensuring reliability generally will become greater when transmission reliability is to be guaranteed and/or when the data being transmitted is large. For instance, hard disk I/O operations for persistent messages can create bottlenecks, e.g., as the system may need to write each message that is received to the file system to persist the message. The message throughput and how fast one can get more data transferred from the producer to the consumer thus can depend greatly on file system I/O. Moreover, in the case of JMS, for example, persisting a Java message instance to a persistent storage may require the instance to be "serialized," e.g., to a binary form. Java serialization comes to mind immediately, but as versatile and automated it may be (by virtue of being reflection based), it maybe far from optimal from a pure performance perspective.

When it comes to transferring large data sets, for example, marking the data as persistent also can affect the data throughput significantly, e.g., as the potentially resource-intensive activities described above may take yet longer when yet more data is involved. Large amounts of data may present challenges, even for data transmissions in non-persistent modes of operation. That is, data transmission via a broker in a non-persistent mode may require the data in transit to be in memory. Although the data oftentimes can be live-streamed from the sending entity to the broker queue, which then can be picked up by the consuming entity from the broker queue, additional challenges may be presented as the size of the data increases. For instance, this approach may have serious repercussions, as a broker node failing may lead to the potential loss of data in transit. Moreover, a consuming entity picking up data at a slower rate (e.g., as more and more data needs to be handled) could inundate the broker queue with data and potentially exhaust the runtime memory, cause the broker to go down, etc.

Some messaging middleware providers have in the past provided advanced features like active/active clustering (e.g., where traffic intended for a failed node is either passed on to an existing node or load-balanced across remaining nodes) to help scale-up data throughput. Some of these advanced features, including JMS clustering, are in many ways similar to modern distributed systems that adopt a "shared nothing architecture" which, as will be appreciated, may in essence be an architecture in which each node is independent and self-sufficient, and where there is no single point of contention across the system. More specifically, in at least some of such cases, none of the nodes share memory or disk storage.

The webMethods JMS Policy-Based Clustering is one example where the message distribution load is shared across multiple instances of the broker (message queue), each of which has its own memory and disk storage. See, for example, U.S. Pat. No. 8,453,163, the entire content of which is hereby incorporated herein by reference.

Unfortunately, the use a cluster of data brokers has not completely resolved the tensions between performance and reliability. Indeed, although the JMS Policy-Based Clustering techniques provided by the assignee represent a good attempt to achieve active/active clustering and load balancing (e.g., in accordance with a round robin algorithm, or the like) for faster throughput and better scalability, further improvements may be possible. For example, data may still need to be marked as persistent to ensure reliability. As another example, message-level failover capability, e.g., in the case where any broker node processing a part of the message goes down because of a system or application level failure or the like, is not necessarily provided. This may present a drawback in use cases where, for example, at least once message delivery is a strict business requirement.

Thus, it will be appreciated that there is a need in the art for improved data transmission techniques, e.g., where reliability is desired in connection with large data sets.

One aspect of certain example embodiments relates to techniques for including intelligence into a messaging system to dynamically and automatically tune a data transmission process at runtime, e.g., in helping to improve throughput without compromising on reliability.

In certain example embodiments, a messaging infrastructure technology is provided that enables large data sets to be sent with a very high throughput while still ensuring guaranteed delivery. Message throughput is scaled by not marking the messages as persistent, thus helping to avoid disk I/O operations. However, message reliability is improved by implementing logic that helps ensures that even if a broker goes down, the data present in that broker queue is still delivered to the consumer.

In certain example embodiments, a method of transmitting data from a sending entity to a receiving entity over a computer-mediated network via a brokering entity is provided. The computer-mediated network includes a plurality of brokers. Fragments of a file to be transmitted are received from the sending entity and at the brokering entity. The method includes, for each said fragment: dynamically determining first and second brokers to which the respective fragment is to be sent, the first and second brokers being different from one another and each having primary and backup queues, and the dynamic determinations being variable for different fragments; storing the respective fragment to transitory memory stores of the first and second brokers; adding to the primary queue of the first broker an indicator of the respective fragment; adding to a backup queue of the second broker the indicator of the respective fragment; and transmitting the received fragment from the first broker whenever possible, and otherwise transmitting the received fragment from the second broker, for reassembly of the file at the receiving entity. Determinations of the first and second brokers to which the fragments are to be sent are based on indications of health for each of the brokers in the network, with the indications of health being fed back to the sending entity through the brokering entity. The sending, receiving, and brokering entities each are computer devices that include respective processing resources including processors and memories.

According to certain example embodiments, the brokers may be organized in one or more clusters, and brokers optionally may be added to a given cluster based on indications of health for the brokers in the given cluster.

According to certain example embodiments, the indications of health for each of the brokers in the network are based at least in part on how full the primary queues on the respective brokers are. For instance, each indication of health may be classified as being one of three different levels of healthiness such that, for example, a first level of healthiness corresponds to normal broker operation, a second level of health indicates that new fragments at least temporarily should be sent to the respective broker with a reduced regularity, and a third level of health indicates that new fragments at least temporarily should not be sent to the respective broker.

According to certain example embodiments, indicators may be removed from backup queues in accordance with a predefined eviction policy. In this regard, the indicator of the fragment(s) currently being transmitted may in certain example embodiments be persisted in a store of the brokering entity. When a received fragment cannot be transmitted from the first broker, certain example embodiments may involve: retrieving, from the store, the indicator of the received fragment that cannot be transmitted from the first broker; removing any entries in the backup queue of the second broker that come before the indicator of the received fragment that cannot be transmitted from the first broker; and transmitting fragments from the backup queue of the second broker, e.g., until the first broker is able to transmit fragments once again.

According to certain example embodiments, determinations of the first and second brokers to which the fragments are to be sent may be made at the brokering entity, e.g., based on gates through which the individual fragments are received. Similarly, according to certain example embodiments, determinations of the first and second brokers to which the fragments are to be sent may be made at the sending entity, e.g., based on broker health related information transmitted thereto.

According to certain example embodiments, fragment transmissions may be mediated via the publish-subscribe model, or one of its variants.

According to certain example embodiments, plural sending devices and/or receiving devices may be provided.

According to certain example embodiments, fragment size and/or fragment transmission frequency to a given channel may be overridable based on health indicators.

According to certain example embodiments, the file and its fragments may be treated by the brokering entity and the brokers as volatile messages and/or neither the file nor the fragments thereof is marked as persistent.

According to certain example embodiments, at least one receiving device may be configured to (a) assemble received fragments in reconstructing the file and/or (b) perform duplicate fragment detection.

In certain example embodiments, a transmission system for use in a computer-mediated network. At least one sending device comprises a first processor and a first memory, and at least one receiving device comprises a second processor and a second memory. At least one brokering entity to which a plurality of broker devices are connected is provided. The broker devices include respective processors and memories and implement respective primary and backup queues. The at least one brokering entity is connected to the at least one sending device via a plurality of channels. The at least one sending device is configured to use its first processor to at least: divide a file to be transmitted into a plurality of fragments, and for each said fragment, dynamically determine which channel to use in transmitting the respective fragment to the at least one brokering entity, with the channel determination being based on health indicators of the broker devices relied to the at least one sending device via the at least one brokering entity. The at least one brokering entity is configured to at least: receive fragments from the at least one sending device via gates respectively connected to the channels, send received fragments to first and second broker devices in dependence on the gate through which the received fragments were received and cause indicators of the received fragments to be enqueued in the primary queues of the first broker devices and backup queues of the second broker devices, and cause received fragments to be transmitted to the at least one receiving device from the first broker devices whenever possible, and otherwise cause received fragments to be transmitted to the at least one receiving device from the corresponding second broker devices.

In certain example embodiments, a brokering entity is configured to relay files among computerized sending and receiving devices through a plurality of brokers deployed in a computer network. The brokering entity comprises at least processor and a memory, a persistent data store, and a plurality of gates to which channels accessibly by the sending devices are connected. The at least one processor and the memory cooperate in managing a data flow controller provided to the brokering entity, the data flow controller being configured to: receive, from the sending entity and through the gates, fragments of a file to be transmitted; and for each said fragment: select first and second brokers from the plurality of brokers based on the gate through which the respective fragment was received, enqueue an identifier of the respective fragment to a primary queue of the selected first broker and a backup queue of the selected second broker, cause the respective fragment to be stored in transitory memory stores of the first and second brokers, cause the received fragment to be transmitted from the first broker to one or more intended recipient receiving devices whenever possible, and otherwise transmitting the received fragment from the second broker thereto, store indicators of the fragments being transmitted to the persistent data store, and transmit broker health related information to the sending devices in order to aid in selecting the channel over which a given fragment is to be transmitted.

In certain example embodiments, there are provided one or more non-transitory computer readable storage mediums tangibly storing instructions that, when executed by at least one processor of a system, perform the above-described and/or other methods.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

A description of an illustrative application integration system and its example methods of operation will now be provided. It will be appreciated that the following description is provided by way of example and without limitation. Indeed, the implementations set forth below reflect the general techniques associated with one publish-and-subscribe approach to providing application integration solutions developed by the assignee, which may be used in connection with the messaging layer, triggers, and trigger subsystems of certain example embodiments. It is noted, however, that the embodiments of the invention are not limited to this specific architecture, these example techniques, or even the publish-and-subscribe approach generally.

Figure 1:
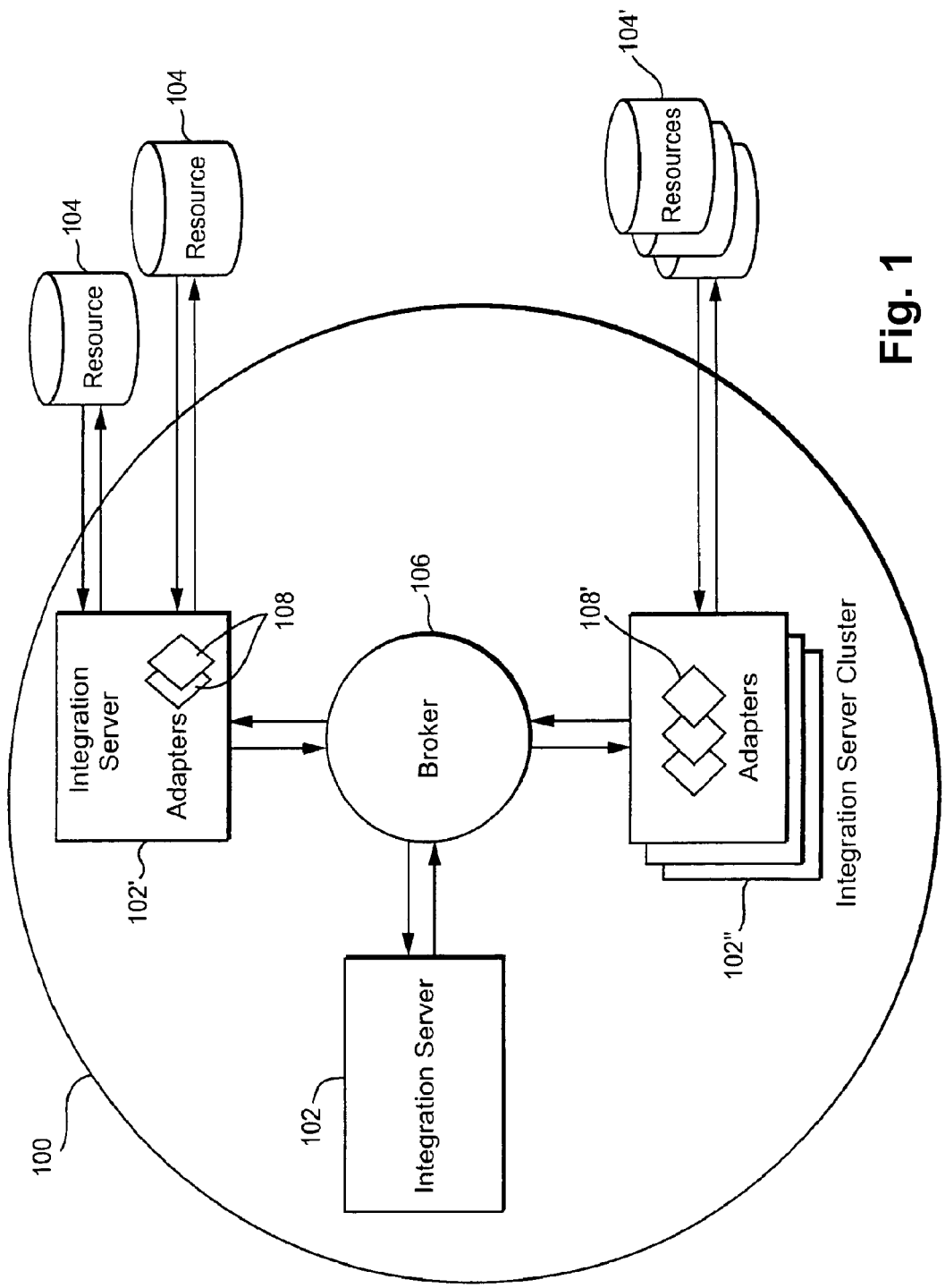
FIG. 1 is a schematic view of an illustrative application integration system.

Referring now more particularly to the drawings, FIG. 1 is a schematic view of an illustrative application integration system 100. A plurality of integration servers 102 are shown, each being in communication with a broker 106. A first integration server 102 is shown, as is a second integration server 102', which includes a plurality of adapters 108. An integration server cluster 102" also is shown, and it includes a plurality of adapters 108' provided thereto.

In general, the integration server is the system's central run-time component. It serves as the entry point for the systems and applications to be integrated, and it is the system's primary engine for the execution of integration logic. It also provides the underlying handlers and facilities that manage the orderly processing of information from resources 104 (or clustered resources 104') inside and/or outside the enterprise. The integration server 102 publishes documents to and receives documents from the broker.

The broker 106 forms the potentially globally scalable messaging backbone of the example components described herein. It provides the infrastructure for implementing asynchronous, message-based solutions that are built on the publish-and-subscribe model or one of its variants, such as, for example, request/reply, publish-and-wait, and the like.

The broker 106 routes documents between information producers (e.g., publishers) and information consumers (e.g., subscribers). Thus, the broker 106 receives, queues, and delivers documents. The broker 106 maintains a registry of document types that it recognizes. It also maintains a list of subscribers that are interested in receiving those types of documents. When the broker 106 receives a published document, it queues it for the subscribers of that document type. Subscribers retrieve documents from their queues. This action usually triggers an activity on the subscriber's system that processes the document.

The basic building blocks of an integration solution that uses the publish-and-subscribe model include, for example, documents, publishable document types, triggers, services, adapter notifications, and canonical documents. These basic building blocks are described, for example, in U.S. Pat. No. 8,136,122, the entire contents of which are hereby incorporated herein by reference. The '122 patent also provides an overview of illustrative publish-and-subscribe paths that may be used in connection with certain example embodiments.

Multiple brokers 106 optionally may be provided to a system 100. Multiple brokers 106 can operate in groups, called territories, which allow several brokers 106 to share document type and subscription information, e.g., as alluded to above.

In view of the foregoing, it will be appreciated that brokers are not simply routers in certain example embodiments.

Broker territories may be formed from broker servers that are placed in different geographical locations, or the like.

Figure 2:
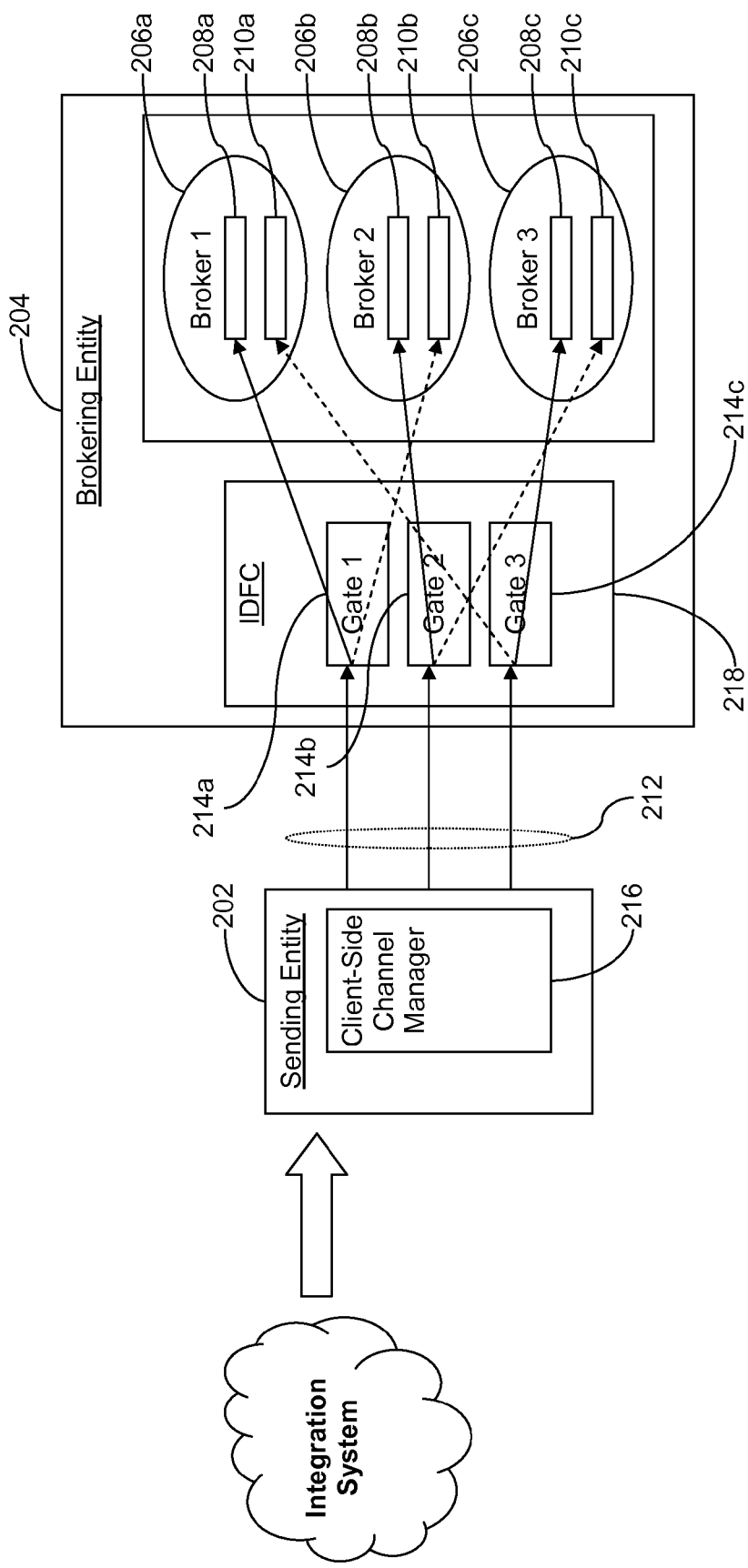
FIG. 2 schematically demonstrates data flowing from a sending entity to a brokering entity in accordance with certain example embodiments.
Figure 3:
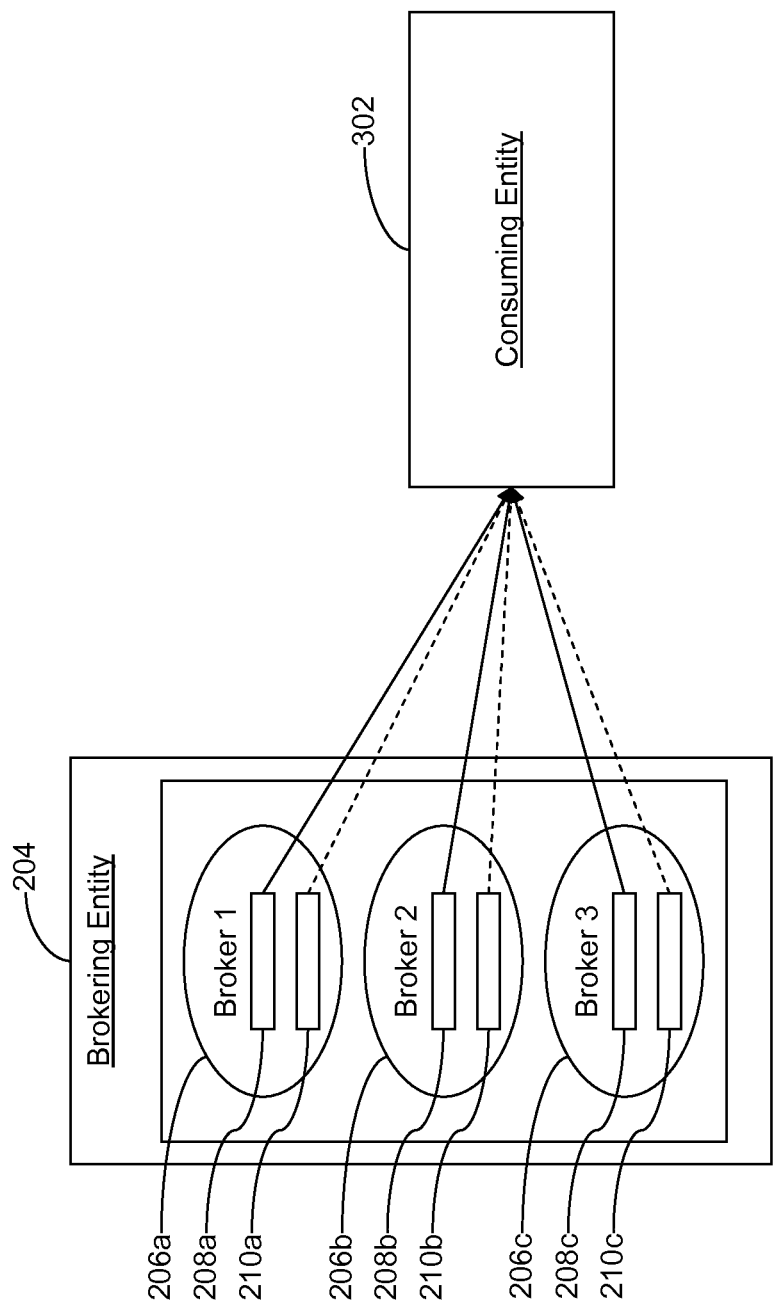
FIG. 3 schematically demonstrates data fragments pulled from a brokering entity being collated back to a single logical entity in accordance with certain example embodiments.

In certain example embodiments, broker clusters may be formed and may include, for example, one or more brokers. The transmission of large data via a cluster of brokers in connection with certain example embodiments involves managing the data in transit at runtime (e.g., via a self-tuning cluster), addressing issues related to failover of broker nodes (e.g., by providing a backup queue), and/or the overall optimization of the resources at-hand (e.g., using a channel pool). Certain example embodiments may be thought of as involving three entities communicating with each other to successfully transmit data. For instance, data originating from a sending entity is routed via a brokering entity and finally reaches a consuming entity. There may be one or more sending entities and one or more consuming entities, and the sending and consuming entities together may represent a group of clients segregated based on their sending/consuming roles. For simplicity, however, FIGS. 2-3 provide illustrations a single client in each of these categories.

According to certain example embodiments, intelligence is programmed into the transmission system, e.g., so as to help enable automatic throttling of data transmissions based on runtime metrics. Example features that enable the architecture of certain example embodiments are described in connection with FIGS. 2-3. FIG. 2 schematically demonstrates data flowing from a sending entity to a brokering entity in accordance with certain example embodiments, and FIG. 3 schematically demonstrates data fragments pulled from a brokering entity being collated back to a single logical entity in accordance with certain example embodiments.

Self-tuning of data transmissions may be performed for performance and reliability gains. In this regard, choosing not to persist the data while in transit is a step toward boosting the performance. Referring more particularly to FIGS. 2-3, data traverses from the sending entity 202 to the brokering entity 204 and is live streamed to the consuming entity 302. The data is held in memory (e.g., at the sending entity 202, at the brokering entity 204, and/or at components of the brokering entity 204) until the transmission is complete; thus, it would be advantageous to minimize or otherwise keep small the data footprint over the network. To help accomplish a reduction in the amount of data to be stored and/or to be transmitted at a given time, the data may be chunked into fragments of a configurable default size at the sending entity 202 before sending it to the brokering entity 204. This may in some cases help remove the need to restart the whole data transmission in the event of a transmission error (e.g., as successfully transmitted chunks need not necessarily be resent from the sending entity 202 if they are stored at the brokering entity 204 or a component thereof, etc.). These fragments may be distributed over the cluster of data brokers 206a-206c in the brokering entity 204 to the primary queues 208a-208c (e.g., as indicated by the solid arrows) to help achieve parallelism, and a copy of the fragment may be sent to one of the backup queues 210a-210c of a secondary data broker selected from the data brokers 206a-206c (e.g., as indicated by the dashed arrows) to help achieve redundancy. The splitting of data into transmittable fragments, and the distribution of fragments to different primary and backup queues on different brokers, helps to ensure reliable transmissions of the fragments. It will be appreciated that the backups could be distributed to multiple different brokers in some cases, that multiple brokers could be used to backup each fragment in some cases, etc. In a related vein, one or more backup brokers may be determined based on, for example, user- or other-defined mappings between primary and backup brokers, random assignments, a round robin or other policy, etc., in different example implementations. At the sending entity 202, the transmission of fragments through the channel pool 212 to gates 214a-214c is facilitated via the client-side channel manager 216. The gates 214a-214c are managed by an intelligent data flow controller (IDFC) 218 (described in greater detail below), which helps route the fragments to the primary queues 208a-208c and backup queues 210a-210c of the brokers 206a-206c. It will be appreciated that the number of channels, gates, brokers, etc., may vary in different implementations, and a one-to-one relationship between these components is not needed in all example embodiments.

An eviction policy may specify when to release the resources used (e.g., the backup queue(s), channels in the channel pool, etc.). In certain example embodiments, at least some of the components in the system may have the ability to signal one another regarding their "health" (e.g., regarding resource utilization, actual or perceived network usage, etc.), whether fragments have been received (thereby suggesting that primary and/or backup queues may be purged, channels can be released, memory on the sending entity can be freed, etc.), and/or the like, in order to help with resource optimization. For instance, individual brokers may have the ability to signal one another, the client-side channel manager, etc., (either directly or indirectly) to communicate the status quo and modus operandi to help in resource optimization, e.g., for load-balancing purposes.

As shown in FIG. 3, the consuming entity 302 is able to receive fragments from the primary queues 208a-208c and the backup queues 210a-210c of the brokers 206a-206c from the brokering entity 204. The consuming entity 302 may have processing capabilities sufficient for collating the fragments and assembling them back into the original data set. Failover, overloads, and/or other runtime problems may be handled automatically by the corresponding entities by communicating actual, perceived, or even expected issues, and scaling up or down the speed of transmission, accordingly. For instance, upon reception of a higher load of data for transmission, the system may gauge the load and scale-up the data broker nodes on-demand, signal the client to automatically establish more channels of data transmission, etc. It thus will be appreciated that the priority-based data flow management may be introduced into the system. For example, the system may be fed with the priority of the clients to cater to and, thus, the system will be able to optimize or otherwise improve resource allocation based on priority and help ensure that more important client requests do not wait for lower priority client requests.

Leveraging these example components, certain example embodiments provide a way to program a system with intelligence to enable it automatically tune itself to optimize or otherwise improve performance with little or no manual monitoring and/or intervention. A detailed example implementation is provided below in connection with use case involving a data flow through a cluster of data brokers. It will be appreciated, however, that the example techniques set forth herein are not limited to brokered messaging, the Java Message Service (JMS), or the particular architectural components described herein. Instead, it will be appreciated that the example techniques set forth herein may be adapted to work with any system where an automatic tuning capability would be desirable and could help, be it in connection with data transmission, sharing computational resources, etc.

Example Implementation

This section provides details concerning example components that may form a messaging system in accordance with certain example embodiments. It will be appreciated that the various components may be provided in different multiplicities, communicative arrangements, architectures, and/or the like, and may communicate using any suitable protocol(s).

A brokering entity acts as the server to broker data flows between multiple clients, which may be broadly categorized as sending and consuming entities, as noted above. The brokering entity may include two basic component types, namely, (a) one or more broker nodes arranged in one or more clusters, and (b) an intelligent data flow controller (IDFC).

An IDFC may in certain example embodiments be implemented as a centralized hardware and/or or other component in a server-side architecture. The IDFC may serve multiple functions. For example, the IDFC may host one or more gates that act as gateways for the data to be routed to the corresponding broker node. Each gate may be configured to route the data fragments reaching it to be sent to two broker nodes, one of which acts as a primary owner, with the other acting as a backup.

The IDFC may collect a runtime health report for each of the broker nodes. The health report may include information concerning the percentage(s) of the primary and/or backup queues being used, whether the brokers are available, whether slowness is being encountered and/or is anticipated to occur, etc. Based on the health reports, the IDFC may suspend transmissions to the gates, slow down the data flow through the gates by partially closing them (e.g., by restricting the number of connections therethrough, by restricting the amount of data passed therethrough, etc). Similarly, if data in a broker queue is being consumed rapidly, the IDFC may open the gate to a greater extent. This way, the IDFC may help choose to open, close, partially close, or otherwise influence the gates at runtime to create one or more self-tuning clusters of brokers. This functionality also may help ensure that the data footprint over the network is optimized. For instance, if the consuming entity is picking up data at a slower rate, the IDFC may slow down other parts of the system. For example, the sending entity may be signaled to reduce the fragment transmission, e.g., by dynamically increasing the wait time between each fragment push, reducing the chunking size, and/or the like.

The IDFC and the clients (including brokers) are capable of processing signals including, for example, signals indicative of runtime events created by the server that prompt the client to act based on the signal type. For example, the IDFC, based on a received runtime health report might send a "slow down signal" to the sending entity. The client has signal processing capabilities running in the background and, in this example, will dynamically resize the chunks and also increase the time between each fragment transmission as a result of such a signal being received. The IDFC may be configured by the user to determine broker health based on the memory in use. Different levels may, for example, be linked to whether to consider the clients are in good health, whether to slow down data flows to the clients, and whether to stop transmissions to the clients. For example, the user may specify that up to 60% memory utilization corresponds to good health (and thus normal execution). On crossing 80% memory utilization, signals may be sent to slow down data flows to the client. On crossing 90% memory utilization, signals may be send to at least temporarily suspend data transmissions to the gate associated with the client. It will be appreciated that other thresholds may be set in different implementations. It also will be appreciated that alternative or additional metrics may be used in different implementations. For instance, network latency, load balancing in terms of number of operations or the like, and/or other factors may be used for these and/or other purposes. Thus, it will be appreciated that the IDFC may participate in signal processing and sending, e.g., based on the health of the brokers in cluster, as the clients may interact with IDFC that is the gateway to the respective servers (which in some implementations may be are brokers).

Although these examples use absolute measures on a broker-by-broker basis, it will be appreciated that relative broker-to-broker measures may be used in place of, or together with, such individualized computations. In this vein, based on the priority of clients that the IDFC is catering to, the system may during times of optimization help ensure that priority clients stand a better chance of receiving performance boosts relative to other clients.

The IDFC may in certain example embodiments create gates in a one-to-one or other relationship to the number of broker nodes in the cluster. The clients may in turn create channels to each of these respective gates by which it may transmit its data. The gates then may relay the data to the primary queue of one broker and the backup queue of a secondary broker node. The lifecycles of these gates may be handled by an IDFC gate manager, which may in certain example instances help in introducing reliability to the data flowing through the brokering entity. That is, reliability may come from or be related to a fragment being sent to two brokers such that, even if one broker crashes, goes down, or otherwise becomes unavailable, the fragment is still available in the backup queue in the second broker.

Based on the health report collected at runtime, the IDFC may automatically engineers the broker cluster topology to either scale-up or scale-down, on-demand. For instance, a more heavily utilized cluster may "borrow" a broker from a less heavily utilized cluster. In other words, a pool of brokers may be provided, and they may be distributed or redistributed amount different clusters based on health reports or the like. It will be appreciated that checks regarding the actual or perceived need for a new broker may be performed, e.g., in order to help ensure that the cost of reconfiguration of one or more clusters is justified. In this regard, the IDFC might wait to determine whether there is a need for at least a predetermined amount of time before triggering a reconfiguration. Reconfiguration events may be communicated to the clients in the form of a signal to manage the channel pool of the sending entity.

Figure 4:
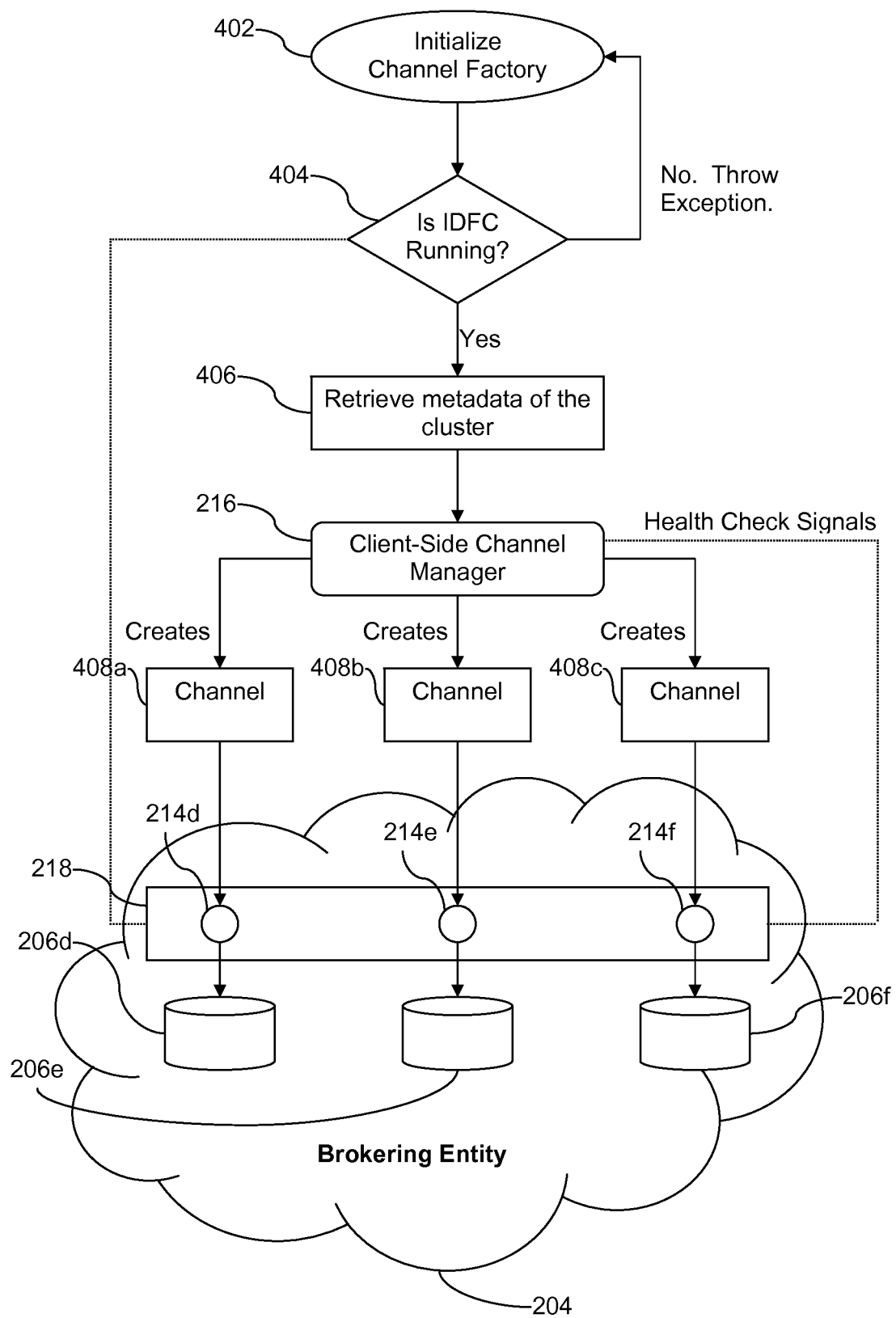
FIG. 4 demonstrates example functions of an intelligent data flow controller (IDFC) and channel pool interactions with the gates to transmit data, in accordance with certain example embodiments.

FIG. 4 demonstrates some of these example functions of the IDFC, and channel pool interactions with the gates to transmit data, in accordance with certain example embodiments. As shown in FIG. 4, the channel factory is initialized in 402. This initialization may include, for example, a check as to whether the IDFC is up and running, and available. If it is, then information concerning the gates hosted on it may be retrieved, e.g., so that channels thereto can be created. A check is made in 404 as to whether the IDFC 218 is running. If it is not, then an exception is thrown, and the process returns to channel factory initialization. If the IDFC 218 is running, however, the metadata of the cluster is retrieved in 406. The metadata of the cluster may indicate how many brokers are already located therein, which clients are treated as preferred clients, which gates are associated with which primary and backup queues, etc. The client-side channel manager 216 receives health check reports from the IDFC 218. It also is able to create channels when and as needed. In the FIG. 4 example, channels 408a-408c are created, and they are linked up with respective gates 214d-214f that provide respective links to brokers 206d-206f.

The broker described herein may be based on an suitable technology that facilitates data flows. A JMS provider, webMethods broker, and/or the like may be used in different example embodiments. Each broker may be configured to maintain two queues, one being a primary queue and the other being a backup queue. Data queued in the primary queue is to be relayed to consuming entities, and the data in the backup queue is maintained for a predetermined period of time (e.g., based on an implemented eviction policy). Fragment identifiers may be stored in the queues, and these fragment identifiers may be GUIDs, UUIDs, or locally unique file identifiers, or the like. The reference (and thus the fragment number) of the head element in the primary queue of a broker may be synched into a shared cache, e.g., provided at the IDFC or elsewhere. For instance, the shared cache may be provided on the IDFC, a Terracotta server array (e.g., to which the broker nodes connect for caching, etc.), and/or any other suitable location. Thus, even if a broker node goes down, the secondary broker node can purge its queue until it reaches the original head element of the primary queue and start transmitting needed fragments to the consuming entity. This behavior may help ensure that duplicates are not sent. It will be appreciated that certain example embodiments may incorporate duplicate detection capabilities into the consumer entities to handle border cases or the like, e.g., where a duplicate is passed on. It is noted that secondary queues may be purged with each transmission from a primary queue, periodically (e.g., every X seconds, operations, etc.), or the like, based on a potentially user-defined eviction policy that is implemented. It also is noted that when the broker node that goes down comes back up again, its primary queue may be purged in a manner similar to that described above (e.g., determining from a store which element is being transmitted and purging entries prior to it), that transmissions based on the backup queue may cease in response to the broker node becoming available again, etc.

The sending entity is a client that sends data to the brokering entity so that it can be related to the consuming entity. A group of clients may send data in certain example embodiments. It will be appreciated that the component interactions described above in connection with FIG. 3 may be implemented through a client-side library provided to each client in this role. Additionally, or in the alternative, the client-side library may implement functionality such as that described below.

These sending entity clients may help create the pool of channels established in the IDFC. Pool creation may involve, for example, the client fetching the configuration of gates on the IDFC, creating channels to each of these gates, etc. The pool manager may help take care of orchestrating these operations and also may act as a channel resource provider, e.g., letting the sending entity clients know which channels to use and when to use them, etc. The channels may be picked up from the pool and then put back after use, e.g., using the pool manager.

Signal processing capability is built into the client libraries. The IDFC sends across signals at runtime for the client to be able to act on the state of the system. For instance, upon reception of suspend signal for a particular gate, the pool manager marks the corresponding channel as "in use" (and thus unavailable) for that particular period of time.

Marshalling logic may be built into the client libraries, and this logic may help in chunking the data into fragments. It is noted that the size of the chunks, and whether to chunk, may be user defined in certain example implementations. These and/or other related properties may, however, be overridden by signals received from the IDFC in some cases, e.g., to throttle back on "troubled" resources, improve overall network utilization, etc.

Client libraries also may be equipped with services to push the fragments via the channels, and the hand off of the data to the particular channel may in certain example embodiments be provided by the pool manager. The system can be configured to continuously push the data fragments, to place a time lag between fragment pushes, etc., e.g., based on user configurable parameters and as potentially overridden or informed by health reports, etc., for system optimization purposes. This may help selectively slow down the data transmission via the channel.

One or more consuming entities may be provided, and each consuming entity may be equipped with a client-side library that implements the following and/or other operations. Collation logic may be built into the client library. Each data fragment may carry a header uniquely identifying itself, e.g., using a fragment identifier, fragment number (identifying the place of this fragment in the sequence of fragments), data identifier (identifying the fragment with the parent data of which it is the fragment), fragment size, etc. Duplicate detection may be built into the client library to help ensure that any fragments received more than once is discarded. As noted above, the brokering entity may be programmed or otherwise configured to implement an eviction policy for the backup queue that helps reduce the likelihood of duplicates being sent. However, the duplicate detection capability built into the consumer entity may help in handling border cases where a duplicate is in fact passed on.

As will be appreciated form the above, the exchange of signals is a normative way of managing runtime communications among and between the server and the clients, and signals may be used to help realize a self-tuning system that conducts runtime optimizations based on metrics collected from the brokers. At design time, parameters that act as the guidelines by which the system optimizes at runtime may be configured. Programming this intelligence into the system help make the system self-reliant in gauging its current status and performing optimizations. Suspend, slow down, shutdown, create channel, and shutdown channel signals, for example, may be used in providing self-tuning capabilities. These signals will be described in connection with FIG. 5, which helps demonstrate how automatic tuning may be achieved by managing the gates via such signals in accordance with certain example embodiments.

Figure 5:
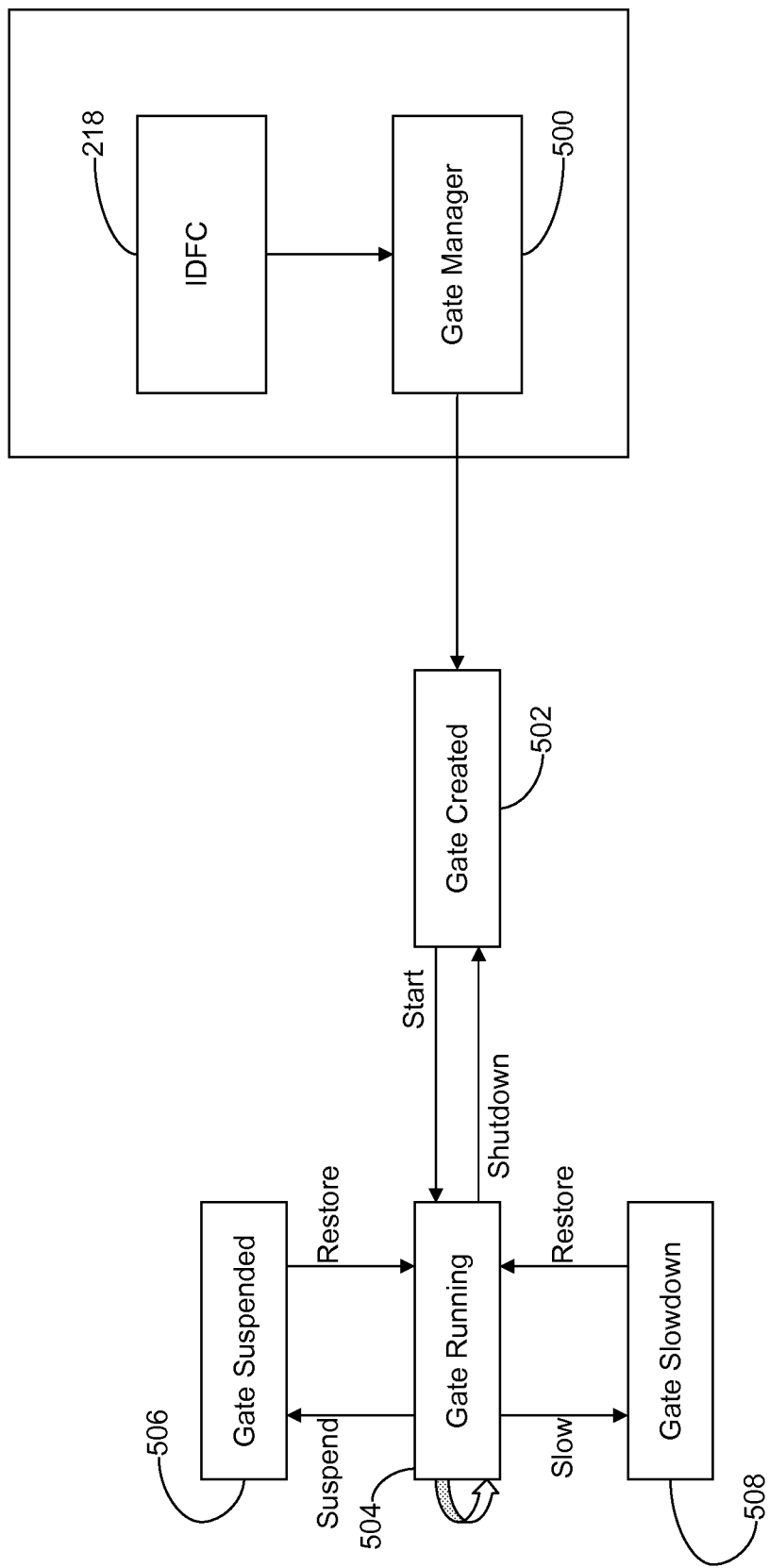
FIG. 5 helps demonstrate how automatic tuning may be achieved by managing the gates using signals in accordance with certain example embodiments.

As shown in FIG. 5, a gate manager 500 (which may in certain example embodiments be a part of, or controlled by, the client-side channel manager 216) creates a gate (500). Once a gate is started, it can be placed into a gate running state (504). The gate may continue to run as normal until a suspend signal is received (which places it into a suspended state (506)), until a slow down signal is received (which places it into a slowed down state (508)), until it is shut down, etc. With respect to a suspend signal, the IDFC 218 (functioning in essence as a server) signals the sending entity client to suspend transmission to a gate. The signal carries information relating to the gate and places it in suspension or timeout mode (e.g., by blocking the corresponding channel from the sending entity client for a predetermined or other time, such as a dynamically determined time based on whether conditions have changed and there is no longer a need for suspension, e.g., because the queue has been reduced, existing or additional processing resources have been available, etc.). The information included in the signal may include an identifier of the gate, an identifier of its backup gate, a wait time, and/or the like.

Similarly with respect to the slow down signal, the IDFC 218 signals the sending entity client to slow down its transmission to a gate. The signal carries information identifying gate, along with other information such as, for example, the intended fragment size, time between fragment pushes, and/or the like. This signal may help in avoiding the broker connected to that gate from becoming inundated with a large number of transmissions and/or a large amount of data.

The create channel signal relates to what happens when the brokering entity adds a new broker instance to the broker cluster. In this situation, the IDFC 218 creates a new gate for communication with the newly created broker instance and sends this signal to the sending entity client to establish a new channel to the gate. This signal may be processed by the sending entity to issue, for example, a "create new channel" API call to the pool manager. The shutdown channel signal may help in shutting down the whole system, e.g., when triggered at the brokering entity. The brokering entity may check whether any data fragments are still in transmission and, upon completion of this check (e.g., and an indication that there are no active and/or queued transmissions left), the brokering entity may issue this signal to the client to shutdown the one or more identified channels.

Figure 6:
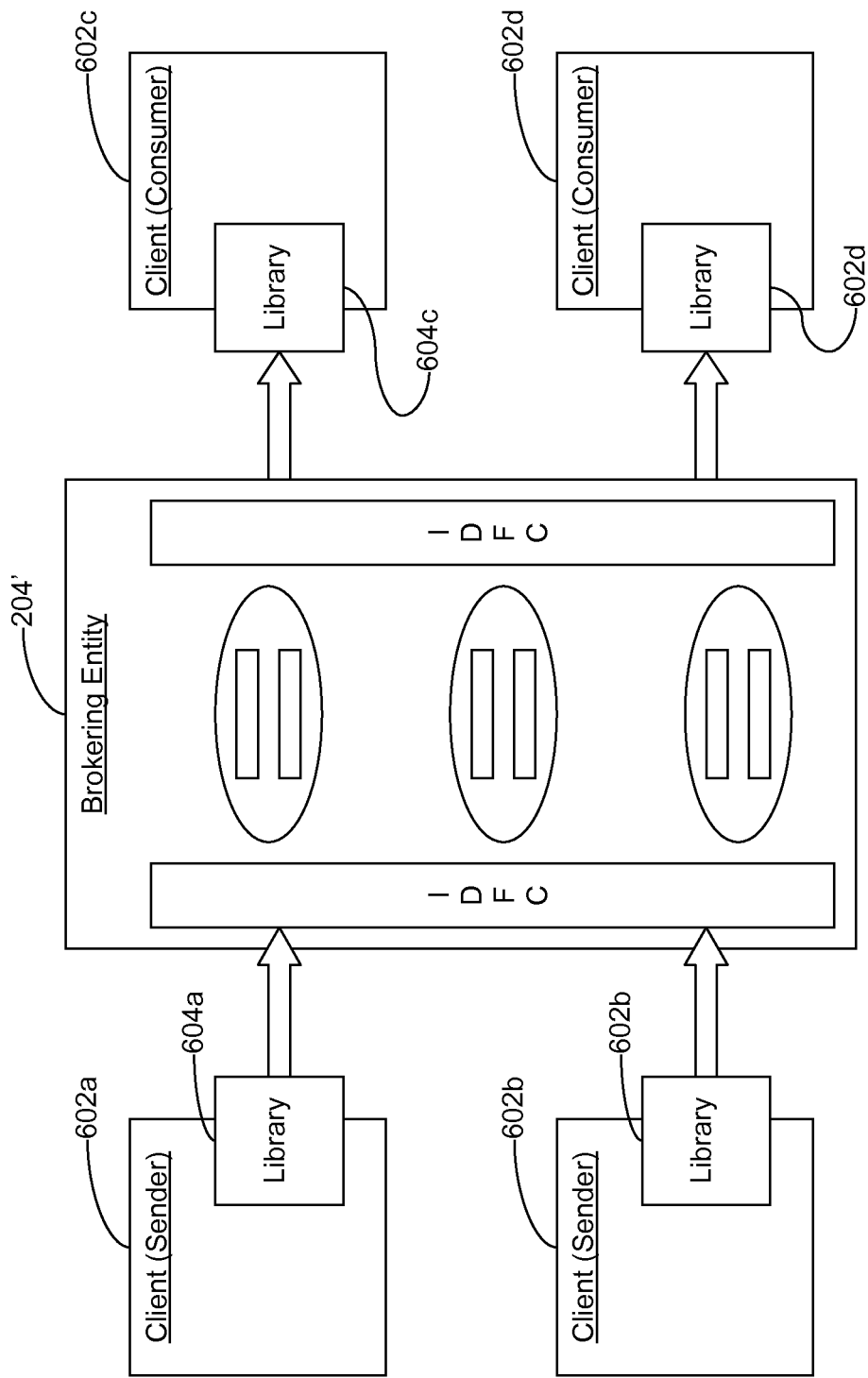
FIG. 6 shows multiple sender to multiple consumer interactions using sender-side and consumer-side IDFCs, in accordance with certain example embodiments.

As will be appreciated from the above, the example techniques may be extensible, e.g., to accommodate multiple senders and/or multiple receivers. In this regard, FIG. 6 shows multiple sender to multiple consumer interactions using sender-side and consumer-side IDFCs, in accordance with certain example embodiments. Clients 602a-602b are senders with respective libraries 604a-064b, and clients 602c-602d are consumers with respective libraries 604c-604s. First and second IDFC instances 218a and 218b are provided for the sender and consumers respectively, within the brokering entity 204'.

The client-side library may act as a medium through which clients can interact with the appropriate IDFC instance, and this library can be enriched to garner performance by using algorithms to aid in splitting the data into fragments and correspondingly collated them to re-form the original dataset. The library may provide the client-side architecture with the ability to check the load at the brokering entity and employ the requisite intelligence to automatically tune the splitting and collation and, subsequently, have a reduced in-memory data footprint at runtime, regardless of whether the client is on the transmitting or the receiving side. This may facilitate specific priority-based transmissions, while taking some or all of the entities into consideration for deploying resources to cater to the data dispatching as per the desired priority. It will of course be appreciated that the example IDFC model may be used to support efficient transmission of data from a sender to multiple consumers in parallel. It will be appreciated that these libraries aid in programming intelligence into the client-side of the architecture based on user-specified requirements and/or preferences. This mechanism of IDFC layer on the server side and library on the client side may further aid in the automatic tuning of the system, be it data transmission, shared computation, and/or the like. In this way, a plurality of consumers may be included in the network, and at least one brokering entity may be further configured to determine channels over which the fragments are to be transmitted to the consumers based on health indications related to the brokers and/or the consumers.

Separate queues may be used in certain example embodiments when it comes to maintaining the primary and backup queues on a broker. In other example embodiments, a single queue with an appropriate marker also may be used. Priority information may be stored at the brokers, included in headers, preconfigured metadata, etc.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of transmitting data from a sending entity to a receiving entity over a computer-mediated network via a brokering entity, the computer-mediated network including a plurality of brokers, the method comprising:
   receiving, from the sending entity and at the brokering entity, fragments of a file to be transmitted; and
   for each said fragment:
      dynamically determining, from among the plurality of brokers, first and second brokers to which the respective fragment is to be sent, the first and second brokers being different from one another and each of the first and second brokers including respective processing resources and volatile memory, each of the first and second brokers having primary and backup queues that are stored in the volatile memory of the respective broker, the dynamic determinations being variable for different fragments,
      storing the respective fragment to the volatile memory included with the first and second brokers by at least adding the respective fragment to the primary queue of the first broker and adding the respective fragment to the backup queue of the second broker,
      transmitting the received fragment from the primary queue of the first broker for reassembly of the file at the receiving entity whenever possible, and
      based on undeliverability of the fragment from the primary queue of the first broker, transmitting the received fragment from the backup queue of the second broker for reassembly of the file at the receiving entity,
   wherein determinations of the first and second brokers to which the fragments are to be sent are based on indications of health for each of the brokers in the network, the indications of health being fed back to the sending entity through the brokering entity, and
   wherein the sending, receiving, and brokering entities each are computer devices that include respective processing resources including processors and memories.

2. The method of claim 1, wherein the brokers are organized in one or more clusters.

3. The method of claim 2, further comprising adding brokers to a given cluster based on indications of health for the brokers in the given cluster.

4. The method of claim 1, wherein the indications of health for each of the brokers in the network are based at least in part on how full the primary queues on the respective brokers are.

5. The method of claim 4, wherein each indication of health is classified as being one of three different levels of healthiness.

6. The method of claim 5, wherein a first level of healthiness corresponds to normal broker operation, a second level of health indicates that new fragments at least temporarily should be sent to the respective broker with a reduced regularity, and a third level of health indicates that new fragments at least temporarily should not be sent to the respective broker.

7. The method of claim 1, wherein the file is fragmented based on a user-configurable size parameter.

8. The method of claim 1, wherein neither the file nor the fragments thereof is marked as persistent.

9. The method of claim 1, further comprising purging the backup queues in accordance with a predefined eviction policy.

10. The method of claim 1, further comprising persisting in a store of the brokering entity an indicator of the fragment(s) currently being transmitted.

11. The method of claim 10, further comprising when a received fragment cannot be transmitted from the first broker:
   retrieving the indicator of the received fragment that cannot be transmitted from the first broker;
   removing any entries in the backup queue of the second broker that come before the received fragment that cannot be transmitted from the first broker; and
   transmitting fragments from the backup queue of the second broker, until the first broker is able to transmit fragments once again.

12. The method of claim 1, wherein determinations of the first and second brokers to which the fragments are to be sent are made at the brokering entity based on gates through which the individual fragments are received.

13. The method of claim 1, wherein determinations of the first and second brokers to which the fragments are to be sent are made at the sending entity.

14. The method of claim 1, wherein fragment transmissions are mediated via a publish-subscribe model.

15. At least one non-transitory computer readable storage medium tangibly storing instructions that are executable by at least one processor to perform the method of claim 1.

16. A transmission system for use in a computer-mediated network, comprising:
   at least one sending device comprising a first processor and a first memory;

at least one receiving device comprising a second processor and a second memory;

at least one brokering entity to which a plurality of broker devices are connected, the broker devices including respective processors and memories and implementing respective primary and backup queues, the at least one brokering entity being connected to the at least one sending device via a plurality of channels;

wherein the at least one sending device is configured to use its first processor to at least:

divide a file to be transmitted into a plurality of fragments, and for each said fragment, dynamically determine which channel to use in transmitting the respective fragment to the at least one brokering entity, the channel determination being based on health indicators of the broker devices relied to the at least one sending device via the at least one brokering entity;

wherein the at least one brokering entity is configured to at least:

receive fragments from the at least one sending device via gates respectively connected to the channels, send received fragments to first and second broker devices in dependence on the gate through which the received fragments were received and cause indicators of the received fragments to be enqueued in the primary queues of the first broker devices and backup queues of the second broker devices, and cause received fragments to be transmitted to the at least one receiving device from the first broker devices whenever possible, and otherwise cause received fragments to be transmitted to the at least one receiving device from the corresponding second broker devices.

17. The system of claim 16, wherein indicators are removable from the backup queues based on an eviction policy.

18. The system of claim 16, wherein plural sending devices and/or receiving devices are provided.

19. The system of claim 16, wherein the health indicators for each of the broker devices in the network are based at least in part on how full the primary queues on the respective broker devices are.

20. The system of claim 19, wherein each health indicator is classified as being one of a plurality of different discrete levels of healthiness.

21. The system of claim 16, wherein fragment size and/or fragment transmission frequency to a given channel are overridable based on health indicators.

22. The system of claim 16, wherein the file and its fragments are treated by the brokering entity and the broker devices as volatile messages.

23. The system of claim 16, wherein the at least one receiving device is configured to (a) assemble received fragments in reconstructing the file and (b) perform duplicate fragment detection.

24. The system of claim 16, wherein a plurality of receiving devices are included in the network, and wherein the at least one brokering entity is further configured to determine channels over which the fragments are to be transmitted to the receiving devices based on health indications related to the brokers and/or the receiving devices.

25. A brokering entity configured to relay files among computerized sending and receiving devices through a plurality of brokers deployed in a computer network, the brokering entity comprising:

at least processor and a memory;

a persistent data store; and a plurality of gates to which channels accessible by the sending devices are connected;

wherein the at least one processor and the memory cooperate in managing a data flow controller provided to the brokering entity, the data flow controller being configured to:

receive, via the gates, fragments of a file transmitted from the sending device; and for each said fragment:

based on the gate through which the respective fragment was received, select first and second brokers from the plurality of brokers, enqueue the respective fragment to a primary queue of the selected first broker, enqueue a copy of the respective fragment to a backup queue of the selected second broker, cause the respective fragment to be stored in volatile memory of the first and second brokers, cause the received fragment to be transmitted from the first broker to one or more intended recipient receiving devices whenever possible, and otherwise transmitting the received fragment from the second broker thereto, store indicators of the fragments being transmitted to the persistent data store, and transmit broker health related information to the sending devices in order to aid in selecting the channel over which a given fragment is to be transmitted.

26. The brokering entity of claim 25, wherein the broker health related information is provided for each of the brokers in the network based at least in part on how full the primary queues on the respective brokers are, and wherein the broker health related information for each said broker includes a discrete level of healthiness classification for the respective broker.

* * * * *